United States Patent [19]

Ferriss et al.

[11] Patent Number: 4,781,462
[45] Date of Patent: Nov. 1, 1988

[54] PATH LENGTH CONTROL SIGNAL DERIVATION CIRCUIT FOR A LASER ANGULAR RATE SENSOR

[75] Inventors: Lincoln S. Ferriss, Denville; Mark A. Weitzner, Union, both of N.J.

[73] Assignee: The Singer Company, Stamford, Conn.

[21] Appl. No.: 13,080

[22] Filed: Feb. 9, 1987

[51] Int. Cl.⁴ ............................................. G01C 19/64
[52] U.S. Cl. ................................................... 356/350
[58] Field of Search ......................................... 356/350

[56] References Cited

U.S. PATENT DOCUMENTS 4,320,974  3/1982  Ljung ................................... 356/350
4,551,021  11/1985  Callaghan et al. ................... 356/350

Primary Examiner—Davis L. Willis
Assistant Examiner—S. A. Turner
Attorney, Agent, or Firm—David L. Davis

[57] ABSTRACT

Electro-optical apparatus for the control of the optical path length in a laser angular rate sensor. An output of a fringe detector dual photodiode and preamplifier, normally present, is processed to recover a laser intensity component present as an amplitude modulation superimposed on the phase-modulated fringe detector signal. The laser intensity component is then provided as an input to the optical path length feedback control system.

4 Claims, 3 Drawing Sheets

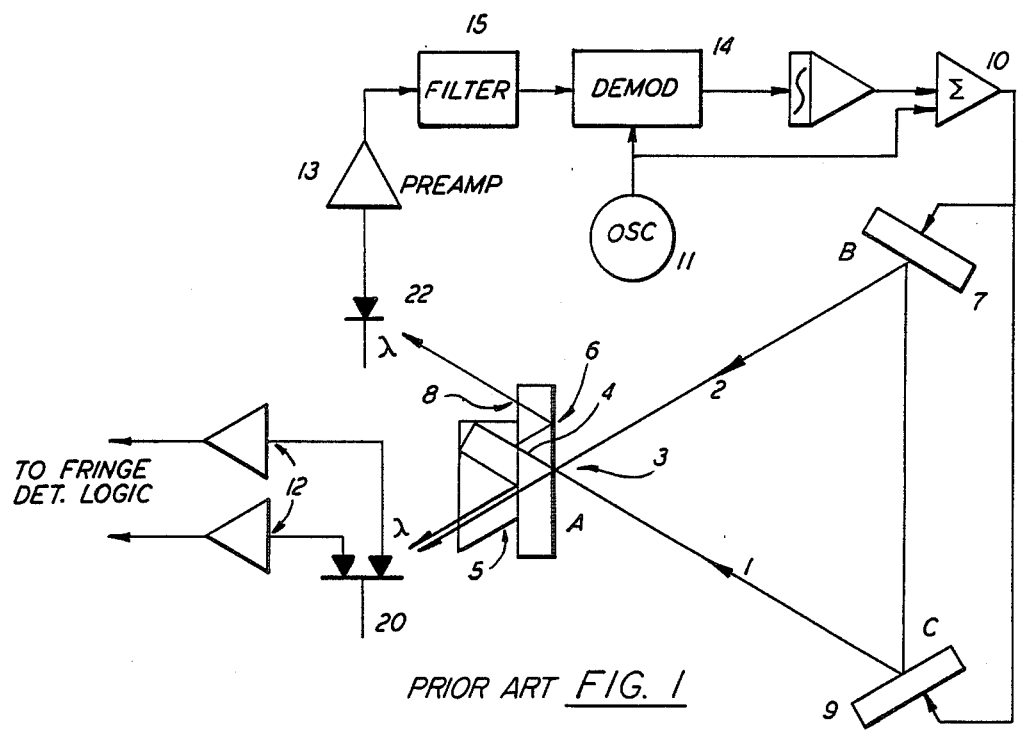
PRIOR ART FIG. 1
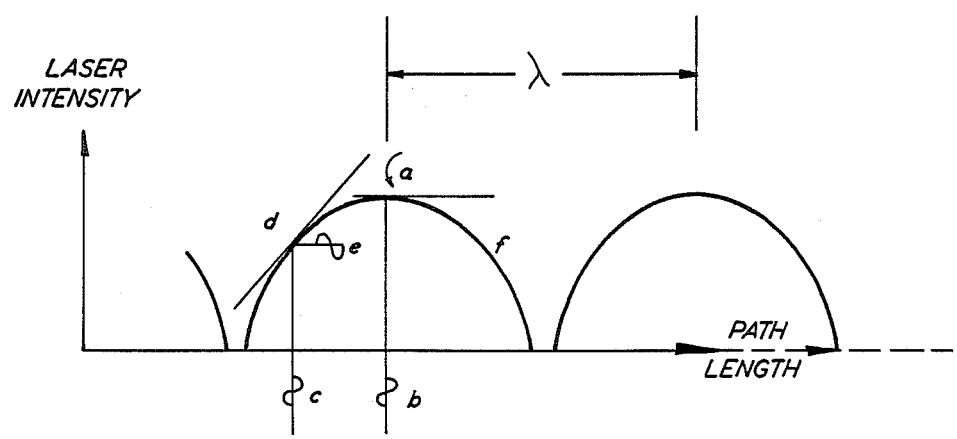
FIG. 2

PATH LENGTH CONTROL SIGNAL DERIVATION CIRCUIT FOR A LASER ANGULAR RATE SENSOR

BACKGROUND OF THE INVENTION

1. Technical Field

This invention relates generally to laser angular rate sensors and more particularly concerns an improvement in apparatus which maintains the optical path length at an integer number of wavelengths of the laser light.

2. Description of the Prior Art

Path length control systems require a signal indicative of laser intensity. Typically this is provided by at least one photodiode and preamplifier.

In the prior art, shown in FIG. 1, a laser angular rate sensor having closed optical cavity ABC is shown with oppositely directed travelling waves 1 and 2 shown confined by reflective mirrors B and C and partially transmissive mirror A at the apices of the triangle. Two of the mirrors, at B and C, are movable in response to the voltage output of summing amplifier 10 so as to maintain the cavity tuned to form an oscillator at the optical lasing frequency. The mirror 3 at A is partially transmissive to allow a processing of light from beams 1 and 2 by combiner prism 5 producing a fringe pattern on dual photodiode 20. Photocurrents produced in the dual photodiode 20 are amplified by dual fringe detector preamplifier 12, the outputs of which are processed to produce incremental angular output pulses in response to sensor rotation. Light from beam 1 is internally partially reflected at two surfaces 4 and 6 of mirror 3 and transmitted to photodiode 22, the photocurrent of which is amplified by preamp 13 and further processed to serve as a measure of cavity tuning.

Referring to FIG. 2, a tuned cavity produces maximum laser intensity, shown at point a on the intensity-versus-path length curve. A small sinusoidal modulation b of the path length produces no corresponding intensity modulation at that frequency due to the flatness of the curve at point a. The known approach recognizes that the same modulation c at point d on the curve produces an output e bearing the same phase as c, due to the positive slope of the curve, at point d. Were the modulation at point f, the output phase would be reversed (not shown). The magnitude and phase of the intensity modulation is used by the path length control loop as an error indication to cause automatic respositioning of the movable mirror 7 and/or 9 of FIG. 1 to achieve an optimum operation at point a of the gain curve of FIG. 2.

Referring again to prior art FIG. 1, oscillator 11 produces a sinusoidal voltage applied to amplifier 10 which in turn vibrates mirror 7 and/or 9. That voltage is also applied to demodulator 14 as a phase reference in the phase-sensitive demodulation of the signal at the output of preamplifier 13. Filter 15 in some implementations of path length control (PLC) loops is often not used.

One problem with the prior art approach lies with the small signal amplitude of the photocurrent in photodiode 22 requiring substantial gain in preamp 13. The small value of photocurrent results from the low level of light intensity impinging on photodiode 22. This light is but a fraction of that transmitted through mirror 3 from beam 1. At interface 4 between mirror 3 and prism 5, the major portion of the light is transmitted into prism 5 where after three internal reflections at the prism surfaces shown, it is transmitted onto photodiode 20 along with light directly transmitted from beam 2. The light reflected at interface 4 loses further intensity upon reflection at point 6 and transmission through point 8. As a result of the low intensity, the signal-to-noise ratio of the signal impinging on photodiode 22 is degraded as is the performance of the path length control function.

A second problem involves compromising the design of the optics to produce transmitted beams for both fringe detector and path length control functions. To produce a beam to illuminate photodiode 22, the interface at 4 must intentionally be partially reflective, thus subtracting from light transmitted into prism 4 and ultimately reducing the light flux available to illuminate fringe detector photodiode 20.

SUMMARY OF THE INVENTION

The present invention, shown in FIG. 3, solves these problems using the output from dual fringe detector preamplifiers 12 to provide signals for operation of the path length control loop. This permits optimization and simplification of the optics design by removing the necessity to have a partially reflective surface at interface 4, allowing full transmitted power from beam 1 to be available in producing a fringing pattern on dual photodiode 20.

Accordingly, it is the primary aim of the present invention to improve a detection and processing means to recover intensity modulation from the outputs of the fringe detector preamplifiers 12. In so doing this permits the elimination of photodiode 22 and its associated preamplifier 13, shown in FIG. 1.

In accordance With the present invention, this objective is attained by a novel detection and processing means which first algebraically combines the outputs of the fringe detector preamps, secondly, amplitude demodulates that signal, and thirdly incorporates a means by which a carrier signal near the modulation frequency is prevented from falsely perturbing the path length control loop.

BRIEF DESCRIPTION OF THE DRAWINGS

FIG. 1 is a block diagram of a prior art fringe detector and path length control circuit for a laser system;

FIG. 2 is a graph of path length versus laser intensity in accordance with which the principles of intentionally acquiring and processing an optical control signal are explained;

FIG. 5(a) shows the frequency of the fringe detector signal, $\omega_f$, and the jitter frequency, $\omega_j$ and reference frequency $\omega_r$ as constant;

FIG. 5(b) shows the status of electronic switch 33 in time relation to FIG. 5(a); and FIG. 5(c) shows the status of ac amplifier output also in time relation to FIG. 5(a).

DETAILED DESCRIPTION

Figure 3:
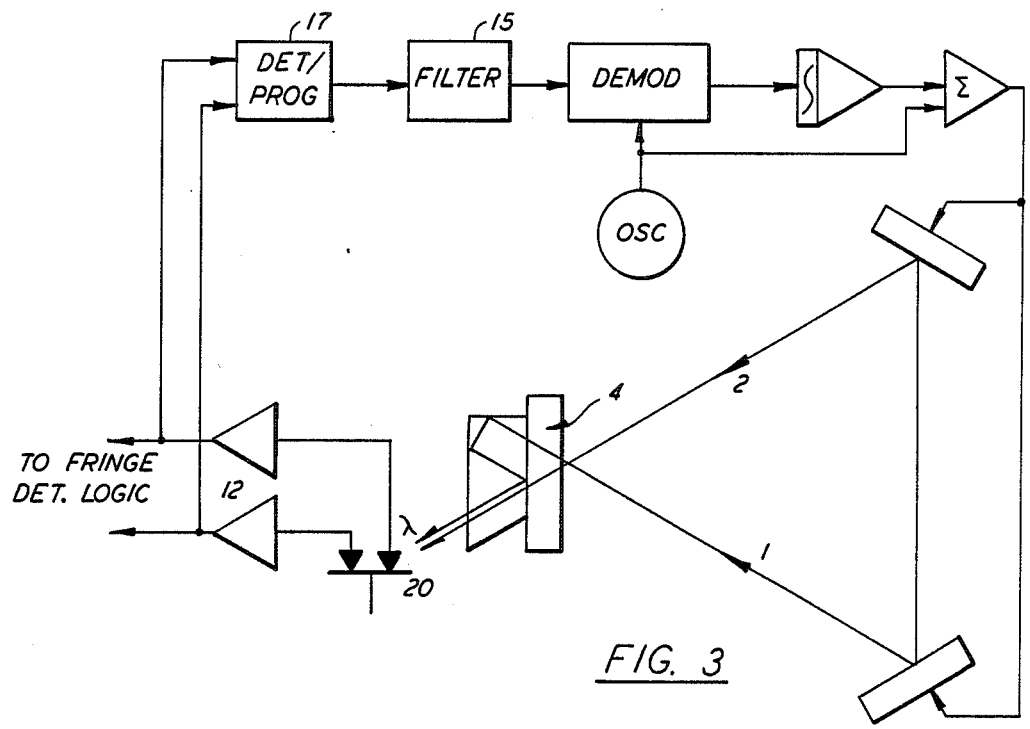
FIG. 3 is a block diagram of the present path length control system in which the optical prism and mirror system is optimized and the control signal is derived from the output of the fringe detector.

Referring to FIG. 3, the output of the dual fringe detector preamplifier 12 consist of a pair of amplitude and phase modulated signals separated in phase by nominally 90°. The phase-leading signal can be expressed as $$A_y = A_o(1 + m_a \sin \omega_j t) \cos k_1 \Omega_i t + \Omega_d \sin \omega_d t]$$

where
- $A_o$ = carrier signal amplitude,
- $m_a$ = degree of amplitude modulation,
- $\omega_j$ = radian frequency of the amplitude modulation,
- $k_1$ = scaling factor determined by the physical, properties of the sensor
- $\Omega_i$ = input angular rate applied to the sensor,
- $\Omega_d$ = magnitude of the dither angular rate, and
- $\omega_d$ = radian frequency of the dither.

The phase-lagging signal $A_x$ is expressed identically except that the term $\cos k_1$ [--] is replaced by $\sin k_1$ [--[. The nominal phase separation between these signals is ordinarily achieved by adjusting the optics to produce a fringe separation related to the separation of the elements of the dual photodiode 20.

In the present invention, the signals are processed in such a manner that the amplitude modulation is recovered for use as a Path Length Control (PLC) error signal while the phase/frequency information is processed as before to produce incremental angular output pulses in response to sensor rotation. The detector circuitry 17 of FIG. 3 is shown in more detail in FIG. 4.

Figure 4:
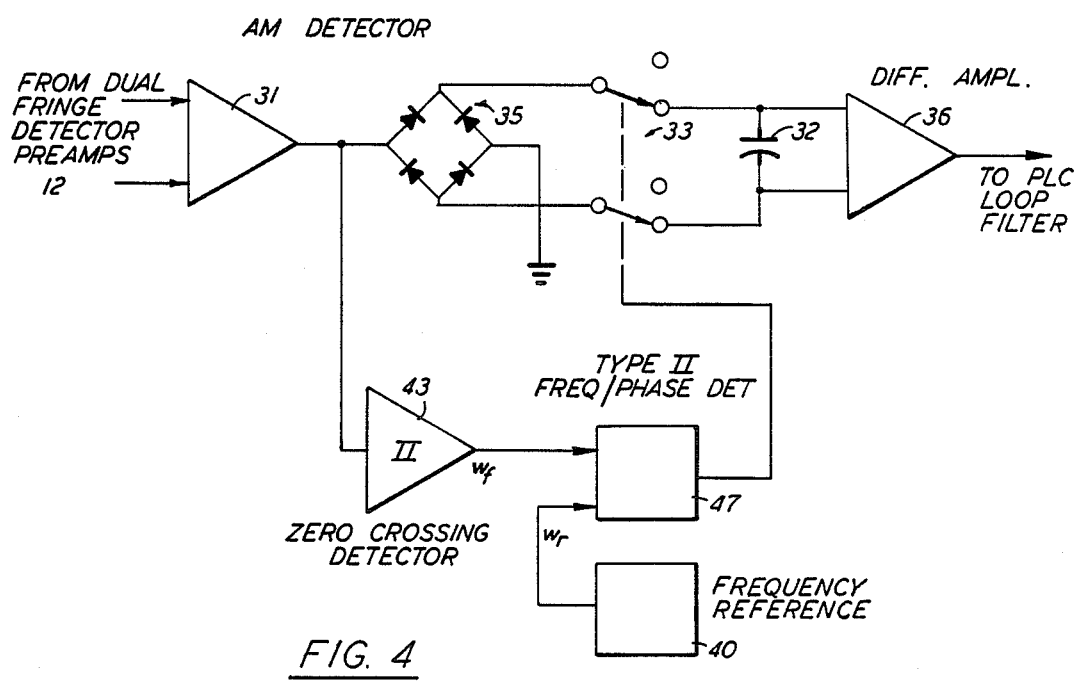
FIG. 4 is a schematic drawing more particularly showing the present control signal derivation circuit.

Referring to FIG. 4, the fringe detector preamplifier output signals are algebraically combined together in combining amplifier 31 and applied to an amplitude detector which could be of the full-wave diode bridge type 35 shown. Switch 33 is shown in the position which connects the output of the amplitude detector to capacitor 32 and ac amplifier 36 and then to the PLC loop filter 15 of FIG. 3. Switch 33 is in this closed position when the frequency of the fringe detector signal, represented by the term $$k_1[\Omega_1 + \Omega_d \omega_d \cos \omega_d t],$$

is much greater than the frequency of amplitude modulation of that signal, $\omega_j$, which is fixed at the jitter frequency. Under those conditions, capacitor 32 acts as a smoothing filter to the rectified carrier but allows the envelope modulation to pass on to amplifier 36. As the frequency of the fringe detector signal diminishes, it approaches the jitter frequency, a condition under which the fringe detector signal would become indistinguishable from its amplitude modulation. This condition would severely perturb the P loop were no measures taken. Opening switch 33 prevents that ambiguity from occurring. Actuation of electronic switch 33 is by means of a frequency comparator circuit consisting of frequency reference generator 40, zero crossing detector 43 and frequency/phase detector 47.

Figure 5:
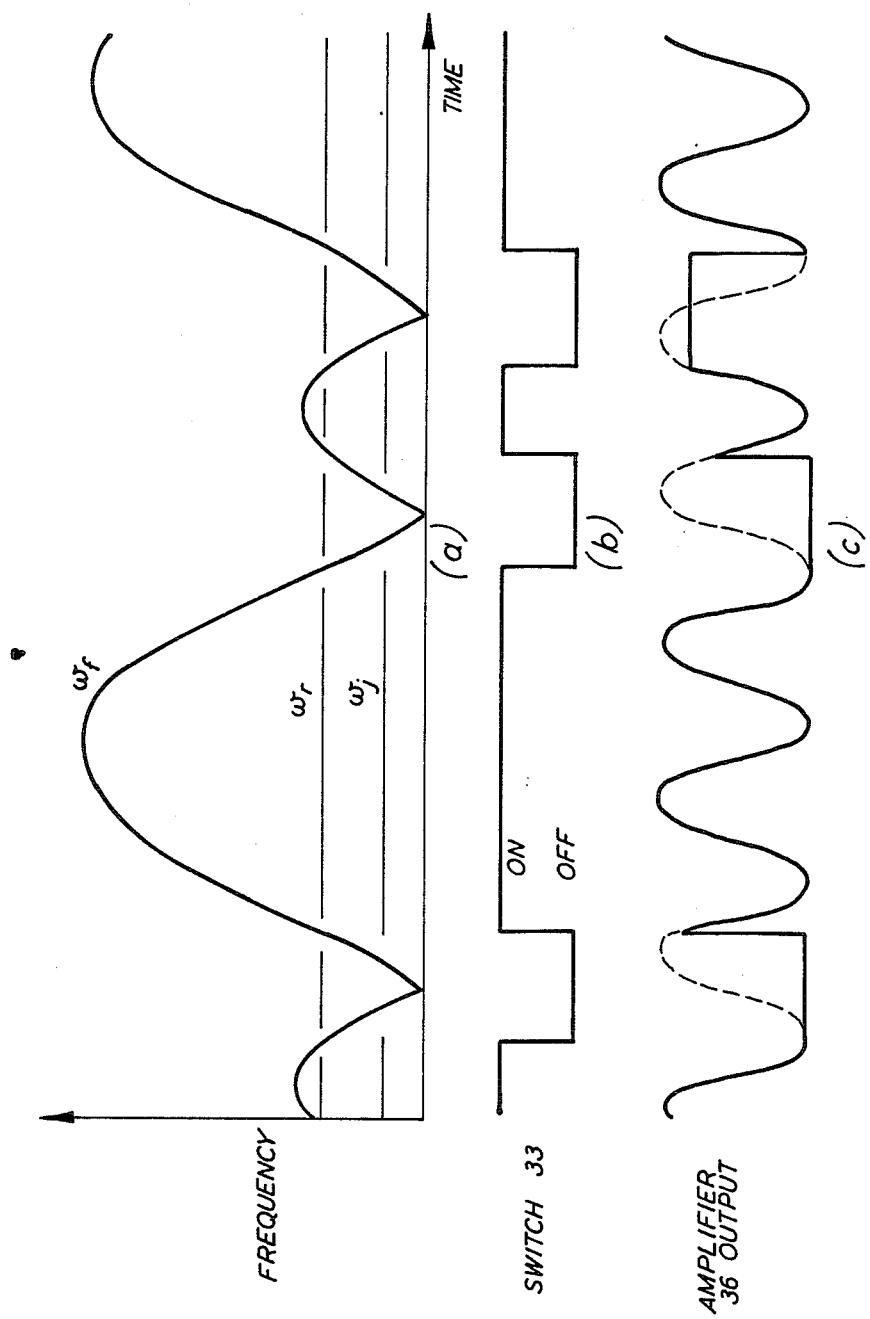
FIG. 5 is a graph of frequency versus time for certain signals present at various points in the circuit of FIG. 4, in particular.

Operation of the frequency comparator circuit is described with the aid of FIG. 5. FIG. 5(a) shows the magnitude of the frequency of the fringe detector signal, $\omega_f$, as a function of time for a condition under which both a dither rate $\Omega_d$ and an input rate $\Omega_i$ of somewhat lesser value are applied. Shown as constant are the jitter frequency $\omega_j$ and the reference frequency $\omega_r$ at a somewhat larger value. FIG. 5(b) shows the condition of the switch 33 of FIG. 4. For $\omega_f \omega_r$, the switch is closed, coupling the amplitude modulated signal to amplifier 36 of FIG. 4. The output might appear as shown by the solid line in FIG. 5(c), a condition wherein a PLC loop error signal of some magnitude exists at the jitter frequency, $\omega_j$. When the switch is open, only the constant charge on capacitor 32 of FIG. 4 is an input to the amplifier 36 producing a constant output. Thus, with the switch open, the fringe detector signal, when its frequency becomes near or less than the jitter frequency, is not coupled into the PLC control loop.

The frequency/phase detector provides a logic zero output when $\omega_f < \omega_r$ and a logic one when $\omega_f > \omega_r$ for actuation of the electronic switch 33. Those skilled in the art will recognize this detector as a Type II phase/frequency detector.

The need for the zero crossing comparator arises in that the phase detector requires logic level signals which the comparator provides.

Incorporation of the present invention into known PLC control systems will produce significant cost savings. For instance, a total of nine photodiodes are presently used in one such system, six of which are for the PLC function. Those six photodiodes and their preamplifiers and attendant installation and alignment are eliminated.

Furthermore, in certain laser systems, a single PLC photodiode is used in the interest of cost reduction, rather than two. When two diodes are used per axis, one for each beam rotation, "winking" effects (intensity modulation at the optical difference frequency) tend to add to zero minimizing interaction with the PLC loop. However, by applying the present invention in such arrangements, components from both beams are already present in the fringe detector signal, so "winking" effects tend to cancel.

The present invention exhibits a great advantage in permitting simplification and optimization of the prism-/mirror optical system and improving the PLC control function by deriving a higher intensity control signal from the output of the fringe detector amplifiers.

Other advantages and modifications of the present arrangement are apparent to one ordinarily skilled in the art as there has been described a novel PLC control system which should only be deemed to be limited in scope by the claims which follow.

What is claimed is:

1. In electro-optical apparatus for the control of the optical path length at an integer number of wavelengths of a generated light beam having a steady state beam intensity, the electro-optical apparatus comprising an optical mirror/prism arrangement, a fringe detection circuit for detecting the fring operation of an optical output of the optical mirror/prism arrangement, and a path length control system deriving a signal from the steady state beam intensity of the optical output for controlling the optical path length in the optical mirror/prism arrangement to maximize the light beam intensity, the path length control system being coupled to the output of the fringe detection circuit and including a control signal derivation circuit connected to the output of the fringe detection circuit, the control signal derivation circuit comprising in combination an amplitude modulation detector, an electronic switch for switching the output of the amplitude modulation detector to a differential amplifier and a frequency/phase detector connected to the input to the amplitude modulation detector for controlling the operation of the electronic switch.

2. In electro-optical apparatus for the control of the optical path length at an integer number of wavelengths of a generated light beam having a steady state beam intensity, the electro-optical apparatus comprising an optical mirror/prism arrangement, a fringe detection circuit for detecting the fringe operation of an optical output of the optical mirror/prism arrangement, and a path length control system deriving a signal from the steady state beam intensity of the optical output for controlling the optical path length in the optical mirror/prism arrangement to maximize the light beam intensity, the path length control system including a control signal derivation circuit coupled to the output of the fringe detection circuit and comprising an amplitude modulation detector whose output is connected to an electronic switch and to a frequency/phase control circuit for controlling the operation of the electronic switch and a differential amplifier connected to the output of the electronic switch.

3. The path length control system of claim 2 wherein a capacitor is connected between an inverting and non-inverting input of the differential amplifier.

4. The path length control system of claim 2 wherein the fringe detection circuit includes a dual fringe detector providing dual outputs, the control signal derivation circuit including a means for combining the dual outputs of the dual fringe detector and for providing an output to the amplitude modulation detector of the control signal derivation circuit.

* * * * *